(12) United States Patent
Sorenson et al.

(10) Patent No.: US 10,681,933 B2
(45) Date of Patent: Jun. 16, 2020

(54) APPARATUS FOR CLEANING ITEMS FROM A CONVEYING APPARATUS

(71) Applicant: Fruit Growers Supply Company, Sherman Oaks, CA (US)

(72) Inventors: David Michael Sorenson, Visalia, CA (US); Jose Torres, Porterville, CA (US)

(73) Assignee: Fruit Growers Supply Company, Sherman Oaks, CA (US)

( * ) Notice: Subject to any disclaimer, the term of this patent is extended or adjusted under 35 U.S.C. 154(b) by 461 days.

(21) Appl. No.: 15/430,226

(22) Filed: Feb. 10, 2017

(65) Prior Publication Data
US 2018/0228200 A1 Aug. 16, 2018

(51) Int. Cl.
| | |
|---|---|
| *H01L 21/02* | (2006.01) |
| *H01L 21/00* | (2006.01) |
| *A23N 12/02* | (2006.01) |
| *B08B 1/00* | (2006.01) |
| *B08B 3/02* | (2006.01) |
| *B65G 45/22* | (2006.01) |
| *B08B 1/04* | (2006.01) |
| *B07B 1/14* | (2006.01) |
| *B07B 1/55* | (2006.01) |

(52) U.S. Cl.
CPC ............ *A23N 12/023* (2013.01); *B08B 1/002* (2013.01); *B08B 1/04* (2013.01); *B08B 3/02* (2013.01); *B08B 3/022* (2013.01); *B08B 3/024* (2013.01); *B65G 45/22* (2013.01); *B07B 1/14* (2013.01); *B07B 1/55* (2013.01)

(58) Field of Classification Search
CPC ......... A23N 12/023; A23N 12/06; B08B 9/00
See application file for complete search history.

(56) References Cited

U.S. PATENT DOCUMENTS

| | | | |
|---|---|---|---|
| 778,613 | A | 12/1904 | Ward |
| 895,622 | A | 8/1908 | Fawell |
| 1,549,499 | A | 8/1925 | Parker |
| 1,776,419 | A | 9/1930 | Dodge |
| 2,748,919 | A | 6/1956 | Britton |
| 3,568,821 | A | 3/1971 | Gronkvist |
| 3,610,404 | A | 10/1971 | Fleischauer et al. |
| 3,672,486 | A | 6/1972 | Kennedy |
| 3,675,760 | A | 7/1972 | Burrage et al. |
| 3,849,195 | A * | 11/1974 | Powell, Jr. ........... A23N 12/023 134/1 |
| 3,944,037 | A | 3/1976 | Stease |
| 4,015,706 | A | 4/1977 | Goffredo |
| 4,046,248 | A | 9/1977 | Goffredo |
| 4,564,100 | A | 1/1986 | Moon |

(Continued)

*Primary Examiner* — Michael D Jennings
(74) *Attorney, Agent, or Firm* — Procopio, Cory, Hargreaves & Savitch LLP

(57) ABSTRACT

A roller brush bed and a fluid delivery system are provided. The fluid deliver system includes a fluid source, a fluid supply tube connected to the fluid source, a movable fluid delivery bar in fluid communication with the fluid supply tube and a drive system attached to the movable fluid delivery bar and configured to move the movable fluid delivery bar relative to the at least one roller brush and along the roller brush bed, wherein the movable fluid delivery bar is configured to spray fluid toward the at least one roller brush as the movable fluid delivery bar is moved along the roller brush bed.

20 Claims, 6 Drawing Sheets

(56) References Cited

U.S. PATENT DOCUMENTS

| | | | |
|---|---|---|---|
| 4,649,818 A * | 3/1987 | Switall | B41F 7/30 |
| | | | 101/147 |
| 4,759,434 A | 7/1988 | Dorner | |
| 4,990,353 A | 2/1991 | van der Schoot | |
| 5,562,114 A * | 10/1996 | St. Martin | A23N 12/02 |
| | | | 134/111 |
| 5,762,177 A | 6/1998 | Baker | |
| 6,308,369 B1 * | 10/2001 | Garcia | H01L 21/67046 |
| | | | 15/102 |
| 6,752,261 B1 | 6/2004 | Gaeddert et al. | |
| 7,882,945 B2 | 2/2011 | Willi | |
| 9,108,802 B2 | 8/2015 | Wehner | |
| 2008/0173335 A1 * | 7/2008 | Yoon | H01L 21/67028 |
| | | | 134/62 |
| 2009/0223013 A1 * | 9/2009 | Clemons | B08B 3/024 |
| | | | 15/320 |

* cited by examiner

APPARATUS FOR CLEANING ITEMS FROM A CONVEYING APPARATUS

BACKGROUND

Field

The present disclosure relates to conveying devices, and more specifically to conveying devices having a cleaning out bar with roller cleaning capabilities.

Related Art

Related art conveying apparatuses, such as roller brush beds, are used to transport produce and other products through packing and sorting houses so that a variety of cleaning and sanitizing processes may be applied to the produce. A related art brush bed 100 is illustrated in FIG. 1. FIG. 1 illustrates a perspective view of a related art brush bed 100 having roller brushes 105, 130. As illustrated, each roller brush 105, 120 extends between a first housing 125 and a second housing 310 and is supported by a central shaft (not illustrated in FIG. 1). Specifically, the roller brushes 105 are supported by central shafts, which may be driven by a drive system. A single drive system may drive the central shafts of both the roller brush 105 and the roller brush 120, or separate drive systems may be used for different roller brushes 105, 120.

Though separate roller brushes 105, 120 are illustrated, all roller brushes 105, 120 may be structurally similar. Thus, similar reference numerals have been used to describe similar features. Each roller brush 105, 120 may include an outer roller brush surface 110 that surrounds each central shaft. The outer roller brush surface 110 may include a plurality of bristles 115 extending outward from the outer roller brush surface 110.

The outer roller brush surface 110 may be attached to the central shaft such that each outer roller brush surface 110 rotates with the rotation of the central shaft on which the outer roller brush surface 110 is mounted. As illustrated, the outer roller brush surface 110 of the roller brushes 105, 120 contact items of produce 10 (e.g., apples, oranges, grapefruit, etc.) that are being moved along the roller brush bed 100.

Liquids, such as water, anti-fungal agents, anti-microbial agents or other compounds are sprayed on the produce 10 as they pass over the roller brushes 105, 110 by a fluid delivery system. FIG. 2 illustrates a perspective view of the related art roller brush bed 100 with a fluid delivery system 200 located above the roller brushes 105, 120. In some related art, the fluid delivery system 200 may include fluid delivery lines 215 that extend over the first housing 125 and connect to a plurality of stationary sprayer nozzles 210. In other related art, the fluid delivery lines 215 may extend over the roller brushes 105, 130. The stationary sprayer nozzles 210 may be used to spray water, fungicides, or sterilizing agents onto the produce 10, as the produce 10 moves down the roller brush bed 100.

However, stationary sprayer nozzles 210 may be unable to fully clean areas of the roller brushes 105, 120 in the related art fluid delivery systems due to limited spray areas associated with each sprayer.

SUMMARY

Aspects of the present application may include a fluid delivery system for a roller brush bed having at least one roller brush. The fluid delivery system may include a fluid source, a fluid supply tube connected to the fluid source, a movable fluid delivery bar in fluid communication with the fluid supply tube and a drive system attached to the movable fluid delivery bar and configured to move the movable fluid delivery bar relative to the at least one roller brush and along the roller brush bed, wherein the movable fluid delivery bar is configured to spray fluid toward the at least one roller brush as the movable fluid delivery bar is moved along the roller brush bed.

Other aspects of the present application may include a roller brush bed. The roller brush bed may include a plurality of roller brushes, a drive system applying torque to a roller brush of the plurality of roller brushes, and a fluid delivery system. The fluid delivery system may include a fluid source, a fluid supply tube connected to the fluid source, a movable fluid delivery bar in fluid communication with the fluid supply tube, and a drive system attached to the movable fluid delivery bar and configured to move the movable fluid delivery bar relative to the plurality of roller brushes and along the roller brush bed, wherein the movable fluid delivery bar is configured to spray fluid toward the plurality of roller brushes as the movable fluid delivery bar is moved along the roller brush bed.

Further aspects of the present application may include a roller brush bed. The roller brush bed may include a plurality of roller brushes, means for applying torque to a roller brush of the plurality of roller brushes, and a fluid delivery system. The fluid delivery system may include a fluid source, a movable fluid delivery bar, means for fluidly connecting the fluid source to the movable fluid delivery bar, and means for moving the movable fluid delivery bar relative to the plurality of roller brushes and along the roller brush bed, wherein the movable fluid delivery bar is configured to spray fluid toward the plurality of roller brushes as the movable fluid delivery bar is moved along the roller brush bed.

DETAILED DESCRIPTION

The subject matter described herein is taught by way of example implementations. Various details have been omitted for the sake of clarity and to avoid obscuring the subject matter. The examples shown below are directed to structures for a roller brush bed and a drive system therefor.

To have a more thorough cleaning operation, example implementations of the present application may provide a fluid delivery system comprising a fluid delivery bar mounted on a drive system that moves the fluid deliver bar relative to a roller bed.

Figure 1:
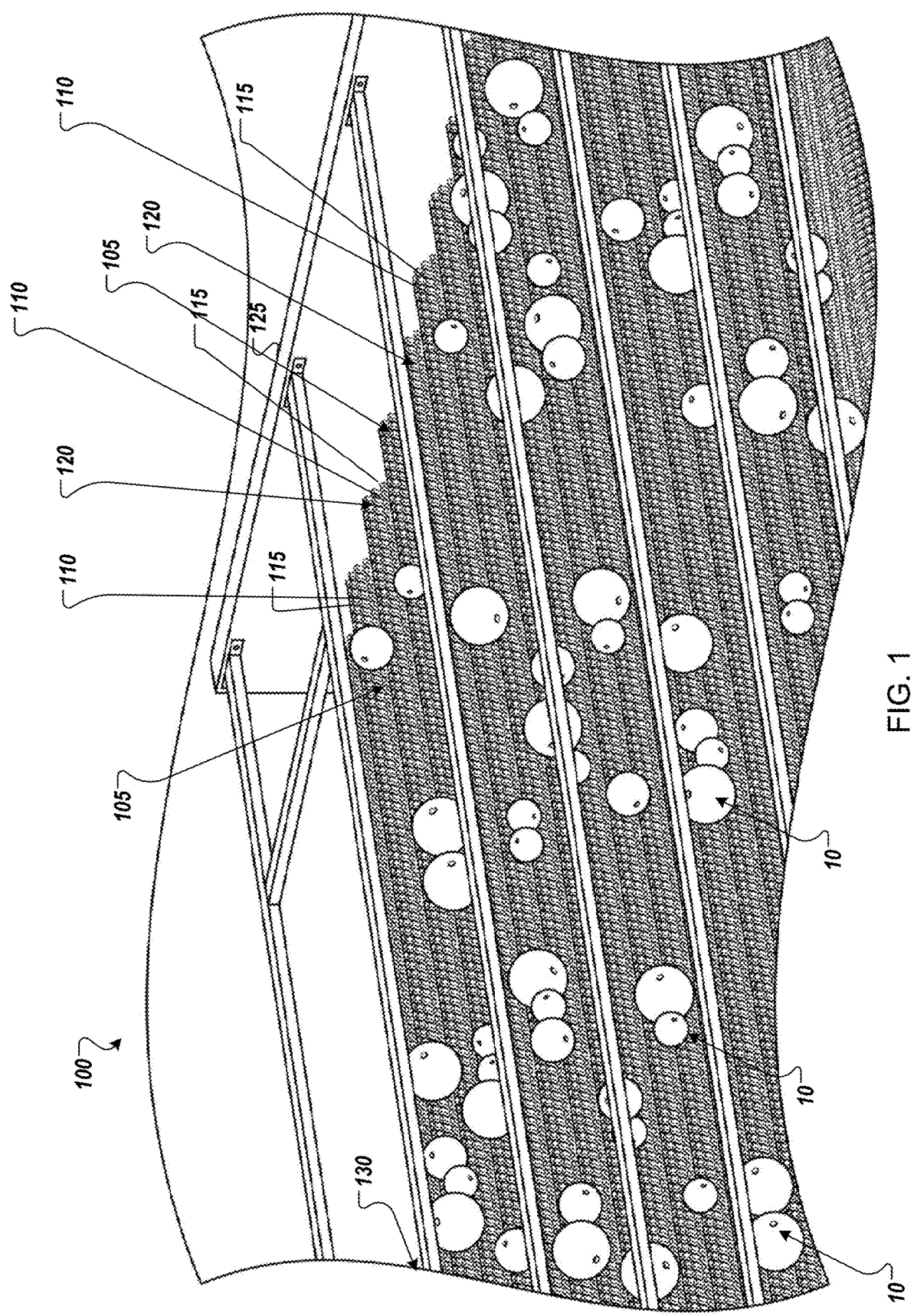
FIG. 1 illustrates a perspective view of a related art brush bed.
Figure 2:
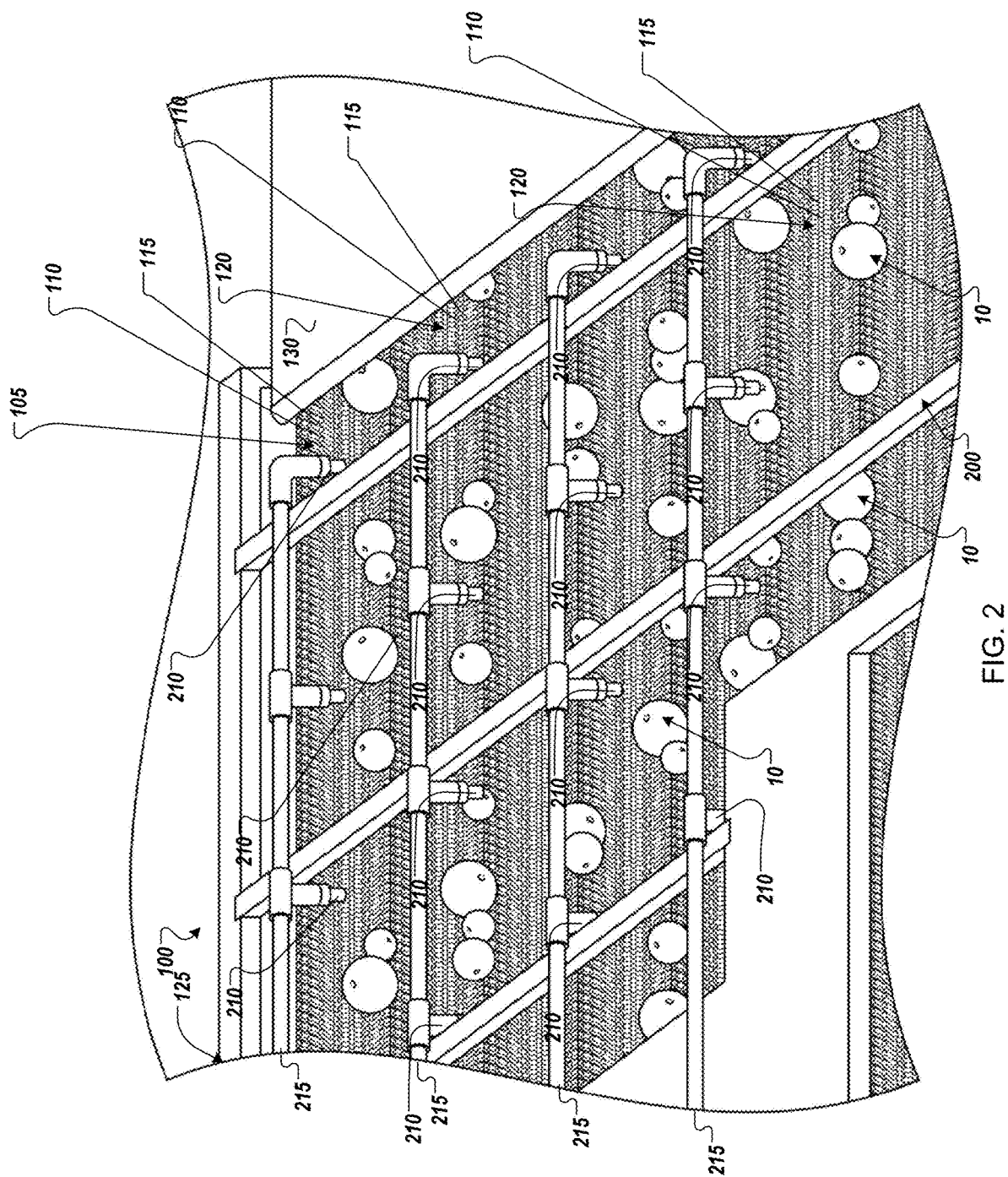
FIG. 2 illustrates a perspective view of the related art roller brush bed with a fluid delivery system located above the roller brushes.
Figure 3:
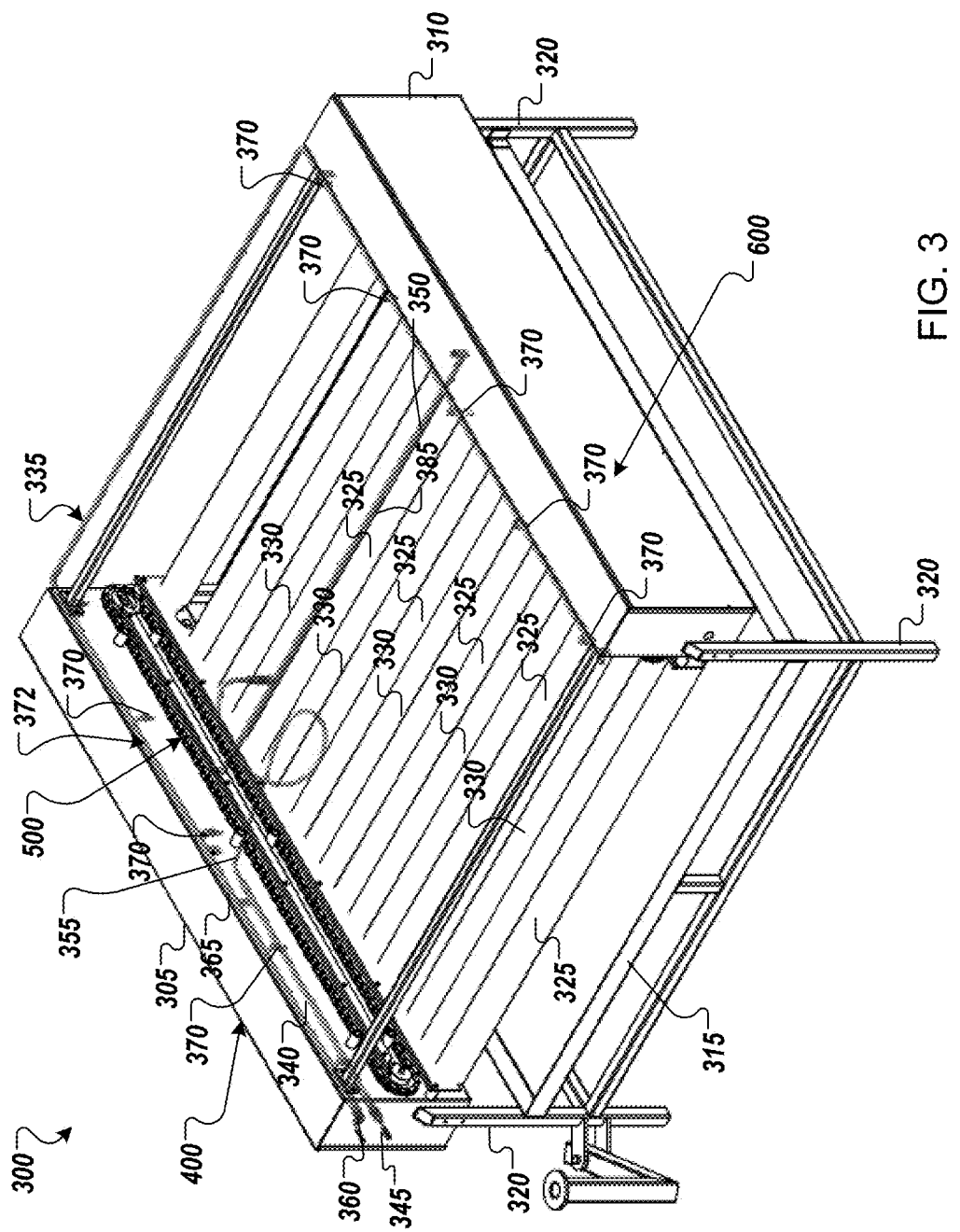
FIG. 3 illustrates a perspective view of a roller brush bed having a movable fluid delivery system.

FIG. 3 illustrates a perspective view of a roller brush bed 300 having a movable fluid delivery system 335. As illustrated, the roller brush bed 300 includes a first housing 305 and a second housing 310 with a plurality of rollers 325, 330 extending between the first and second housings 305, 310. In some example implementations, the first housing 305 may house a drive system 400 for some of the rollers 325 and the second housing 310 may house a drive system 600 for the remainder of the rollers 330. In other example implementations, the drive system 400 may drive all of the rollers 325, 330. The drive systems 400, 600 and roller brushes 325, 330 are discussed in greater detail below with respect to FIG. 4.

The first housing 305, second housing 310, and the roller brushes 325, 330 may be mounted on a support frame 320 that houses a drain pan 315 beneath the roller brushes 325, 330. The drain pan 315 may collect fluid run off from the roller brushes 325, 330 and direct the fluid to a recycling tank that can be connected to a fluid supply tank or fluid source, as discussed in greater detail below.

The movable fluid delivery system 335 includes a fluid supply tube 340 fluidly communicating with an intake valve 345 that can be connected to a fluid supply tank not illustrated in FIG. 3 (fluid supply tank discussed in greater detail below). The fluid supply tube 340 may be formed from tubing such as plastic, polymer, or resin piping (such as polyvinyl chloride (PVC)), metal tubing (such as copper tubing or galvanized piping) or any other rigid or semi-rigid tubing that may be apparent to a person of ordinary skill in the art. The intake valve 345 is not particularly limited, and may be any type of valve or fitting that may be apparent to a person of ordinary skill in the art.

The fluid supply tube 340 may be connected to a movable fluid delivery bar 350 by flexible tubing 355. The movable fluid delivery bar 350 may include one or more sprayer nozzles 385 (discussed in greater detail below) along its length. The movable fluid delivery bar 350 may be formed from tubing such as plastic, polymer, or resin piping (such as polyvinyl chloride (PVC)), metal tubing (such as copper tubing or galvanized piping) or any other rigid or semi-rigid tubing that may be apparent to a person of ordinary skill in the art. The flexible tubing 355 may be formed from flexible material such as plastic or polymer tubing, mesh metal tubing or any other flexible tubing that may be apparent to a person of ordinary skill in the art. The movable fluid delivery bar 350 may be mounted on a drive system 500 that moves the moveable fluid delivery bar 350 relative to the roller brushes 325, 330. The drive system 500 of the movable fluid delivery bar 350 is discussed in greater below.

In some example implementations, the movable fluid delivery system 335 may also include a stationary component 372 formed by a stationary supply tube 365 fluidly communicating with an stationary intake valve 360 that can be connected to the fluid supply tank not illustrated in FIG. 3 (fluid supply tank discussed in greater detail below). The stationary supply tube 365 may be formed from tubing such as plastic, polymer, or resin piping (such as polyvinyl chloride (PVC)), metal tubing (such as copper tubing or galvanized piping) or any other rigid or semi-rigid tubing that may be apparent to a person of ordinary skill in the art. The stationary intake valve 360 is not particularly limited and may be any type of valve or fitting that may be apparent to a person of ordinary skill in the art.

In some example implementations, the stationary supply tube 365 may form a U-shape at least partially surrounding the roller brushes 325, 330 by extending in a first direction along the first housing 305, continuing in a second direction perpendicular to the first housing 305 and then extending in a third direction along the second housing 310. One or more stationary sprayers 370 may be located along the length of the stationary supply tube 365 to spray fluid along the edges of the roller brush bed 300.

Figure 4:
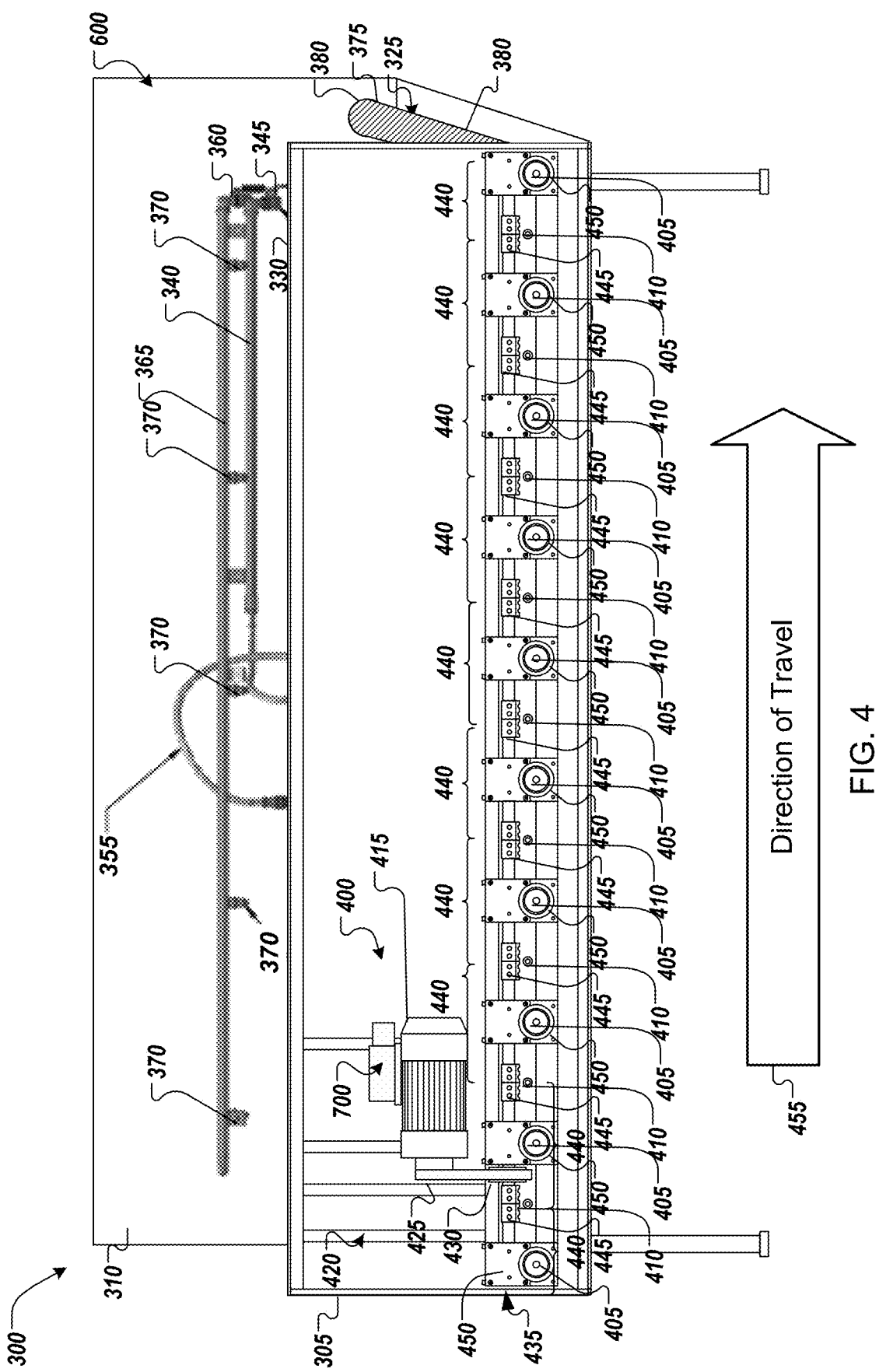
FIG. 4 illustrates a side view of the drive systems of the roller brush bed according to an example implementation of the present application.

FIG. 4 illustrates a side view of the drive systems 400 and 600 of the roller brush bed 300 according to an example implementation of the present application. As discussed above, the roller brush bed 300 includes a first housing 305, which houses a drive system 400. The first housing 305 may form a rectangular structure that surrounds the drive system 400. The first housing 305 may include openings through which central shafts 405, 410 of the plurality of roller brushes 325, 330, respectively, may pass. The material construction of the first housing 305 is not particularly limited and may include any material that may be obvious to a person of ordinary skill in the art. For example, the first housing 305 may be formed from aluminum, rolled steel, cast iron, or any other material that a person of ordinary skill in the art may select.

In FIG. 4, the drive system 400 may include a motor 415 coupled to a transmission 420 which transmits torque from the motor 415 to one or more of the central shafts 405 of the plurality of roller brushes 325. As illustrated in FIG. 4, the transmission 420 may only transmit torque to the non-adjacent central shafts 405 of the plurality roller brushes 325 and may not transmit torque to the central shafts 410 located between the central shafts 405 to which torque is transmitted by the transmission 420 in some embodiments. The second drive system 600 located within the second housing 310 may transmit torque to the central shaft 410 located between the central shafts 405 to which the drive system 400 transmits torque. In other words, the transmission 420 may transmit torque to the central shafts 405 of every other roller brush 325, with the transmission 420 not transmitting torque to central shafts 410. Similarly, the second drive system 600 may drive the central shafts 410. However, example implementations of the present application are not limited to this configuration and, in some example implementations, the transmission 420 may transmit torque to all central shafts 405, 410 of every roller brush 325, 330, or may transmit torque to adjacent central shafts 405, 410.

Though roller brush 325 may be driven by a different drive system 400 from the roller brush 330, all roller brushes 325, 330 may be structurally similar. Thus, similar reference numerals have been used to describe similar features. Each roller brush 325, 330 may include an outer roller brush surface 375 that surrounds each central shaft 405, 410. The outer roller brush surface 375 may include a plurality of bristles 380 extending outward from the outer roller brush surface 375. In some example implementations, the bristles 380 may be formed from nylon, foam rubber, or any other material that may be apparent to a person of ordinary skill in the art for use in handling produce or other goods being directed through the roller brush bed 300.

The outer roller brush surface 375 may be attached to each central shaft 405, 410 such that each outer roller brush surface 375 rotates with the rotation of the central shaft 405, 410 on which the outer roller brush surface 375 is mounted. The attachment between the outer roller brush surface 375 and the central shaft 405, 410 may be achieved by adhesive, screw mounting, bolt mounting, friction fitting, or any other attachment mechanism that may be apparent to a person of ordinary skill in the art.

As illustrated, the outer roller brush surface 375 of the roller brushes 325, 330 contacts items of produce (e.g., apples, oranges, grapefruit, etc.) that are being moved along the roller brush bed 300 in the direction of travel 455. In some example embodiments, the roller brushes 325, 330 may be level along the direction of travel 455. In other example embodiments, the roller brushes 325, 330 may be angled upward or downward along the direction of travel 455. The rotation of central shafts 405, 410, caused by torque from the drive systems 400, 600, may be translated to the outer roller brush surface 375 of the roller brushes 325, 330. The rotation of the outer roller brush surface 375 of the roller brushes 325, 330 may cause the produce to move along the roller brush bed 300 in the direction of travel 455.

The transmission 420 may include a belt 425 which mechanically couples the motor 415 to a drive wheel 430 mounted on a motor drive shaft 435. As illustrated, in some example implementations, the motor drive shaft 435 may be oriented to extend along the length of the housing 305 and orthogonal to the central shafts 405, 410 of the roller drive brushes 325, 330. The belt 425 may transmit torque from the motor 415 to the drive wheel 430. Further, the drive wheel 430 may transmit torque to the motor drive shaft 435. In some example implementations, the motor drive shaft 435 may be formed by a plurality of shaft sections 440 which are joined together by linear shaft connectors 445.

The motor drive shaft 435 may be mechanically coupled to one or more of a plurality of gearboxes 450. In some example implementations, each of the plurality of gearboxes 450 may be a right angle gearbox configured to output torque to an output shaft orthogonal to an input shaft. For example, each of the plurality gearboxes 450 may be a hypoid gearbox. In such example implementations, the input shaft may be the motor drive shaft 435, and the output shaft may be one of the central shafts 405 of a roller drive brush 325. This configuration may allow each of the plurality gearboxes 450 to transmit torque received from the motor drive shaft 435 to drive one of the central shafts 405 of a roller brush 325.

The roller brush bed 300 also includes the second housing 310 (illustrated behind the first housing 305 in FIG. 4). The second housing 310 may be similar to the first housing 305, and in some example implementations, the second housing 310 may house a second drive system 600. The second drive system 600 maybe include all of the components discussed above (e.g., a second motor, and a second transmission identical or substantially similar to the motor 415 and transmission 420 of the first drive system discussed above) with respect to the first drive system 400, but be connected to alternating central shafts 410 not connected to the first drive system 400 as may be apparent to a person of ordinary skill in the art. The second housing 310 may also form a rectangular structure that surrounds the second drive system 600 and may also include openings (unlabeled in the figures of the present application) through which the central shafts 405, 410 of the plurality of roller brushes 325, 330, respectively, may pass. The material construction of the second housing 310 is also not limited and may be any material selected by a person of ordinary skill in the art including but not limited to aluminum, steel, iron, or any other material.

In some example implementations, the first drive system 400 and the second drive system 600 may include a controller 700 configured to control the rotational speed of the motor 415 of the first and second drive systems 400, 600. In some example, implementations the controller 700 may be a variable voltage controller (such as a variable power supply) configured to vary the voltage applied to the motor 415 to vary the rotational speed of the first and second drive systems 400, 600. Further, in some example implementations the controller 700 may apply a first voltage of the first drive system 400 and a second, different voltage to the second drive system 600 such that the roller brushes 325 connected to the first drive system 400 rotate at a different speed from the roller brushes 330 connected to the second drive system.

Figure 5:
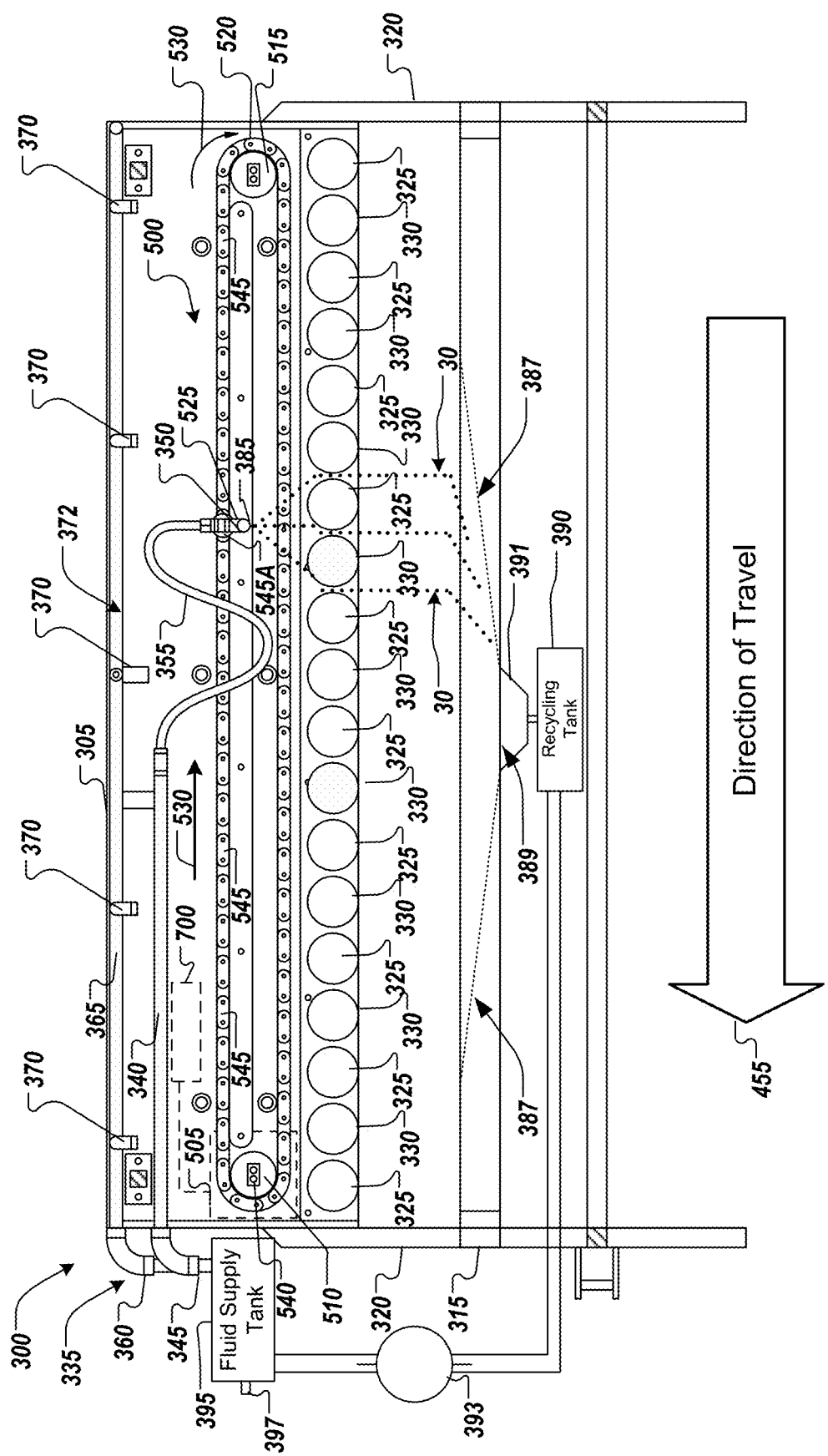
FIG. 5 illustrates a first side view of the roller brush bed according to an example implementation with a second housing and a second drive system removed.

FIG. 5 illustrates a first side view of the roller brush bed 300 with the second housing 310 and second drive system 600 removed. As discussed above, the roller brush bed 300 includes the first housing 305 and the second housing 310 (removed in FIG. 5) with a plurality of rollers 325, 330 extending between the first and second housings 305, 310. The first housing 305, second housing 310, and the roller brushes 325, 330 may be mounted on a support frame 320 that houses a drain pan 315 beneath the roller brushes 325, 330. The drain pan 315 may collect fluid runoff 30 from the roller brushes 325, 330 and direct it to a recycling tank 390 that can be connected to a fluid supply tank or fluid source 395. Specifically, the drain pan 315 may have angled surfaces 387 that direct the fluid runoff 30 to an opening 389 in the drain pan 315. The opening 389 may connect to an intake port 391 of the recycling tank 390. The runoff 30 may be collected in the recycling tank 390 for reuse. In some example implementations, fluid processing chemicals (e.g., anti-microbial agents, anti-fungal agents, etc.) may be added to the recycling tank to process the fluid runoff 30 as it is collected. The recycling tank 390 may be connected to the fluid supply tank 395 by a pumping unit 393. The pumping unit is not particularly limited and may be any type of pump or pumping mechanism that might be apparent to a person of ordinary skill in the art. A fluid input port 397 may be provided on the fluid supply tank 395 to allow additional fluid to be added to the movable fluid delivery system 335. In some example implementations, the fluid supply tank 395 may include internal valves to selectively switch between the pumping unit 396 and the fluid input port 397 to control fluid flow between the fluid supply tank 395, pumping unit 396 and fluid input port 397.

Further, within the movable fluid delivery system 335, the fluid supply tank 395 is connected to a fluid supply tube 340 by an intake valve 345. The fluid supply tube 340 may be connected to a movable fluid delivery bar 350 by flexible tubing 355. The movable fluid delivery bar 350 may include one or more sprayer nozzles 385. The sprayer nozzles 385 may be configured to spray fluid toward the roller brushes 325, 330. In some example implementations, the sprayer nozzles 385 may produce a wide stream covering two or more roller brushes 325, 330 simultaneously. In other example implementations, the sprayer nozzles 385 may produce a narrow stream covering only one or less than one roller brush 325, 330 at a time.

Further, the sprayer nozzles 385 are illustrated as being oriented on the movable fluid delivery bar 350 to spray vertically downward (e.g., orthogonal to the direction of travel 455). However, the sprayer nozzles 385 are not limited to this configuration and may be oriented at an acute angle relative to direction of travel 455. The movable fluid delivery bar 350 may be mounted on a drive system 500 that moves the moveable fluid delivery bar 350 relative to the roller brushes 325, 330. The drive system 500 of the movable fluid delivery bar 350 is discussed in greater below.

In some example implementations, the movable fluid delivery system 335 may also include a stationary component 372 formed by a stationary supply tube 365 fluidly communicating with a stationary intake valve 360 connected to the fluid supply tank 395. In some example implementations, the stationary supply tube 365 may form a U-shape at least partially surrounding the roller brushes 325, 330 by extending in a first direction along the first housing 305, continuing in a second direction perpendicular to the first housing 305 and then extending in a third direction along the second housing 310. One or more stationary sprayers 370 may be located along the length of the stationary supply tube 365 to spray fluid along the edges of the roller brush bed 300. The stationary sprayers 370 may be configured to spray fluid toward the roller brushes 325, 330. In some example implementations, the stationary sprayers 370 may produce a wide stream covering two or more roller brushes 325, 330 simultaneously. In other example implementations, the stationary sprayers 370 may produce a narrow stream covering only one or less than one roller brush 325, 330 at a time.

Further, the stationary sprayers 370 are illustrated as being oriented on the stationary supply tube 365 to spray vertically downward (e.g., orthogonal to the direction of travel 455). However, the stationary sprayers 370 are not limited to this configuration and may be oriented at an acute angle relative to direction of travel 455.

The drive system 500 of the movable fluid delivery bar 350 may include a motor 505 mounted within the first housing 305 at one end of the first housing 305. The motor 505 may be coupled to a drive shaft 540 passing through a sidewall of the first housing 305 such that the drive shaft 540 rotates based on torque received from the motor 505. A drive wheel 510 may be mounted on the drive shaft 540 such that rotation of the drive shaft 540 causes a rotation of the drive wheel 510. A drive chain 520 may be wrapped around both the drive wheel 510 and a free wheel 515 mounted at an opposite end of the first housing 305 to support the drive chain 520. The rotation of the drive wheel 510 may apply a torque to the drive chain 520 to cause the drive chain 520 to rotate around the drive wheel 510 and free wheel 515 in the direction 530.

The drive chain 520 may be formed from a plurality of links 545. The material of the links 545 is not particularly limited and may include metal (e.g., iron, steel, zinc, cobalt, or any metal or alloy that may be apparent to a person of ordinary skill in the art), polymer (e.g., plastic or any other polymer that might be apparent to a person of ordinary skill in the art), ceramic materials or other materials that might be apparent to a person of ordinary skill in the art. Example implementations of the present application are not limited to a drive chain 520 and alternative configurations may be used. For example, a drive belt may be used to replace the drive chain 520. Other configurations may be apparent to a person of ordinary skill in the art.

As illustrated, a drop link 525 may be mounted on one of the links 545A. The movable fluid delivery bar 350 may be mounted on drop link 525 to hang below the drive chain 520 during rotation of the drive chain 520. As illustrated in FIG. 5, the rotation direction 530 of the drive chain 520 may cause the movable fluid delivery bar 350 to move in the opposite direction of travel 455 of the roller brushes 325, 330 when the movable fluid delivery bar 350 is in an upper position. In this position, the sprayer nozzles 385 are spaced apart from the roller brushes 325, 330 to spray a wide area of roller brushes 325, 330.

As discussed below with respect to FIG. 6, the rotation direction 530 of the drive chain 520 may cause the movable fluid delivery bar 350 to move the in the same direction as the direction of travel 455 of the roller brushes 325, 330 when the movable fluid delivery bar 350 is in a lower position.

In some example implementations, the motor 505 of the drive system 500 of the movable fluid delivery bar 350 may be connected to the controller 700 and the controller 700 may be configured to control the rotational speed of the motor 505 of the drive system 500 of the movable fluid delivery bar 350. As discussed above, the controller 700 may be configured to control the rotational speed of the motor 415 of the first and second drive systems 400, 600. In some example implementations, the controller 700 may be a variable voltage controller (such as a variable power supply) configured to vary the voltage applied to the motor 505 and the motor 415 to vary the rotational speed of the first and second drive systems 400, 600 and drive system 500 of the movable fluid delivery bar 350. As discussed above, in some example implementations, the controller 700 may apply a first voltage of the first drive system 400 and a second, different voltage to the second drive system 600 such that the roller brushes 325 connected to the first drive system 400 rotate at a different speed from the roller brushes 330 connected to the second drive system 600. Further, in some example implementations, the controller 700 may also apply a third, different voltage to the drive system 500 of the movable fluid delivery bar 350 at a third different speed. Thus, in some example implementations, the roller brushes 325 may rotate at a first speed, the roller brushes 330 may rotate at a second speed, and the drive chain 520, supporting the movable fluid deliver bar 350, may rotate at a third speed.

Figure 6:
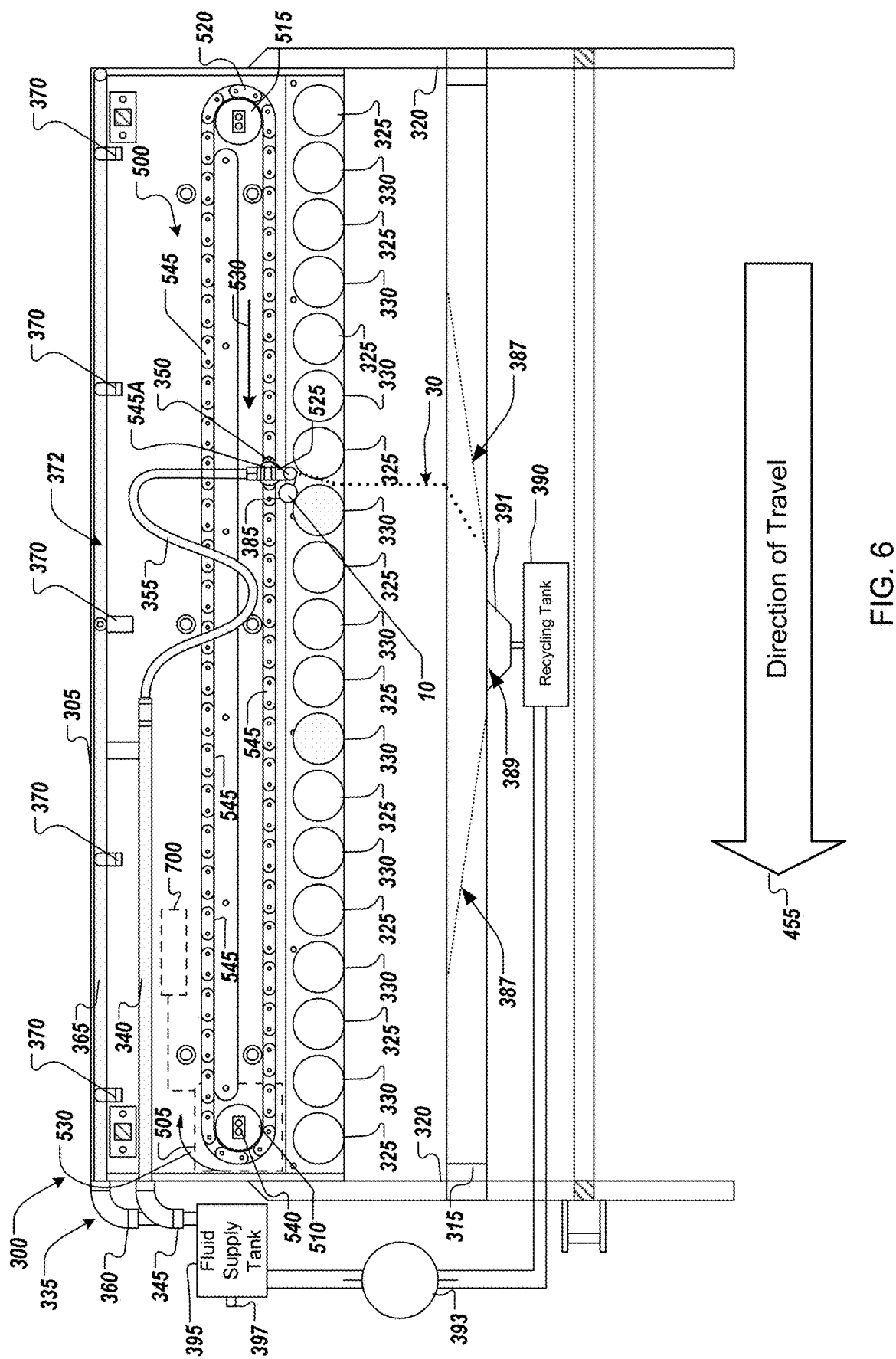
FIG. 6 illustrates a second side view of the roller brush bed according to an example implementation with a second housing and a second drive system removed.

FIG. 6 illustrates a second side view of the roller brush bed 300 with the second housing 310 and second drive system 600 removed. Again, the roller brush bed 300, a first housing 305, a second housing 310, and the roller brushes 325, 330 may all be mounted on a support frame 320 that houses a drain pan 315 beneath the roller brushes 325, 330. The drain pan 315 may collect fluid runoff 30 from the roller brushes 325, 330 and direct it to a recycling tank 390 connected to a fluid supply tank 395 by a pumping unit 393. The fluid supply tank 395 may include a fluid input port 397 to allow additional fluid to be added to the movable fluid delivery system 335 and internal valves to switch between the pumping unit 396 and the fluid input port 397.

Further, the fluid supply tank 395 is connected to the fluid supply tube 340 by an intake valve 345. The fluid supply tube 340 may be connected to a movable fluid delivery bar 350 by flexible tubing 355. The movable fluid delivery bar 350 may include one or more sprayer nozzles 385. The sprayer nozzles 385 may be configured to spray fluid toward the roller brushes 325, 330. In some example implementations, the sprayer nozzles 385 may produce a wide stream covering two or more roller brushes 325, 330 simultaneously. In other example implementations, the sprayer nozzles 385 may produce a narrow stream covering only one or less than one roller brush 325, 330 at a time.

Again, the sprayer nozzles 385 are illustrated as being oriented on the movable fluid delivery bar 350 to spray vertically downward (e.g., orthogonal to the direction of travel 455). However, the sprayer nozzles 385 are not limited to this configuration and may be oriented at an acute angle relative to direction of travel 455. The movable fluid delivery bar 350 may be mounted on a drive system 500 that moves the moveable fluid delivery bar 350 relative to the roller brushes 325, 330. The drive system 500 of the movable fluid delivery bar 350 is discussed in greater detail below.

The drive system 500 of the movable fluid delivery bar 350 may include a motor 505 mounted within the first housing 305. The motor 505 may be coupled to the drive shaft 540 passing through a sidewall of the first housing 305 such that the drive shaft 540 rotates based on torque received from the motor 505. A drive wheel 510 may be mounted on the drive shaft 540 such that rotation of the drive shaft 540 causes a rotation of the drive wheel 510. A drive chain 520 may be wrapped around both the drive wheel 510 and a free wheel 515 mounted at an opposite end of the first housing 305 to support the drive chain 520. The rotation of the drive wheel 510 may apply a torque to the drive chain 520 to cause the drive chain 520 to rotate around the drive wheel 510 and free wheel 515 in the direction 530.

The drive chain 520 may be formed from a plurality of links 545. The material of the links 545 is not particularly limited and may include metal (e.g., iron, steel, zinc, cobalt, or any metal or alloy that may be apparent to a person of ordinary skill in the art), polymer (e.g., plastic or any other polymer that might be apparent to a person of ordinary skill in the art), ceramic materials or other materials that might be apparent to a person of ordinary skill in the art.

As illustrated, the movable fluid delivery bar 350 may be mounted on a drop link 525 to hang below the drive chain 520 during rotation of the drive chain 520. As illustrated in FIG. 6, the rotation direction 530 of the drive chain 520 may cause the movable fluid delivery bar 350 to move in the same direction as the direction of travel 455 of the roller brushes 325, 330 when the movable fluid delivery bar 350 is in a lower position.

When the movable fluid delivery bar 350 is in the lower position, the movable fluid delivery bar 350 may move along the roller brushes 325, 330 and push out any produce 10 that may be stuck between adjacent roller brushes 325, 330. As illustrated, the movable fluid delivery bar 350 may hang below the upper edges of the adjacent roller brushes 325, 330, allowing the movable fluid delivery bar 350 to drop into the gaps between the adjacent roller brushes 325, 330 and bump out stuck produce 10. The drop link 525 supporting the movable fluid delivery bar 350 may allow the movable fluid delivery bar 350 to swing or rotate relative to the link 545A of the drive belt 520. Thus, this configuration may allow the movable fluid delivery bar 350 to ride along the top of the roller brushes 325, 330 bouncing in and out of the gaps between rollers 325, 330 to move produce 10 along the roller brush bed 300 and clear out any produce that becomes stuck during operations.

In the lower position illustrated in FIG. 6, the movable fluid delivery bar 350 may apply a high pressure fluid stream of water, sanitizer, antifungal agent or any other cleaning fluid to the roller brushes 325, 330 to clean the bristles 115 and remove buildup of dirt, wax, debris, or any other substance. In some example implementations, the proximity of the movable fluid deliver bar 350 to the roller brushes 325, 330 may allow for greater cleaning efficiency compared to stationary cleaning systems in the related art that are mounted above the roller brushes. Additional, the proximity in combination with increased pressure may also improve cleaning efficiencies in some example implementations.

Again, the motor 505 of the drive system 500 of the movable fluid delivery bar 350 may be connected to the controller 700, which may also be connected to the motors 415 of the first and second drive systems 400, 600. In some example implementations, the controller 700 may be a variable voltage controller (such as a variable power supply) configured to vary the voltage applied to the motor 505 and the motor 415 to vary the rotational speed of the first and second drive systems 400, 600 and drive system 500 of the movable fluid delivery bar 350. As discussed above, in some example implementations, the roller brushes 325 may rotate at a first speed, the roller brushes 330 may rotate at a second speed, and the drive chain 520, supporting the movable fluid delivery bar 350, may rotate at a third speed.

In some example implementations, varying the speeds of the roller brushes 325, 330 and the speed of the movable fluid delivery bar 350 may allow for increased cleaning efficiency and improve removal of buildup of dirt, wax, debris, or any other substance. Further, in some example implementations, the combination of proximity, increased pressure, and variable speeds of the roller brushes 325, 330, and the movable fluid delivery bar 350 may also improve cleaning efficiencies compared to related art systems.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

We claim:

1. A fluid delivery system for a roller brush bed having at least one roller brush, the fluid delivery system comprising:
   a fluid source;
   a fluid supply tube connected to the fluid source;
   a movable fluid delivery bar in fluid communication with the fluid supply tube; and
   a drive system attached to the movable fluid delivery bar and configured to move the movable fluid delivery bar relative to the at least one roller brush and along the roller brush bed, wherein the movable fluid delivery bar is configured to spray fluid toward the at least on roller brush while the movable fluid delivery bar is moved along the roller brush bed,
   wherein the drive system comprises a drive chain which supports the at least one roller brush, and
   wherein the movable fluid delivery bar is supported and moved relative to the at least one roller brush supported by the drive chain.

2. The fluid delivery system of claim 1, wherein the drive system comprises:
   a drive shaft mechanically coupled to a motor;
   a drive wheel mechanically coupled to the drive shaft; and
   the drive chain mounted on the drive wheel and configured to rotate with the drive wheel based on torque transmitted from the motor by the drive shaft.

3. The fluid delivery system of claim 2, wherein the movable fluid delivery bar is oriented relative to the drive chain to hang beneath the drive chain during rotation of the drive wheel based on torque transmitted from the motor by the drive shaft.

4. The fluid delivery system of claim 1, wherein the drive chain includes a drop link; and wherein the drop link rotatably attaches the movable fluid delivery bar to the drive chain.

5. The fluid delivery system of claim 1, wherein the drive chain is oriented to move the fluid delivery bar relative to the at least one roller brush in both a first direction and a second direction opposite the first direction;

wherein the movable fluid delivery bar is oriented to contact the at least one roller brush when the movable fluid delivery bar is moved in the first direction; and wherein the movable fluid delivery bar is oriented to be separated from the at least one roller brush when the movable fluid delivery bar is moved in the second direction.

6. The fluid delivery system of claim 1, wherein the movable fluid delivery bar comprises at least one sprayer nozzle oriented to direct fluid toward the at least one roller brush, wherein the at least one sprayer nozzle is configured to direct fluid at an acute angle relative to the at least one roller brush.

7. The fluid delivery system of claim 1, further comprising:
a stationary supply tube connected to the fluid source; and
at least one stationary sprayer connected to the stationary supply tube and configured to spray fluid toward the at least one roller brush.

8. The fluid delivery system of claim 1, further comprising:
a fluid recycling tank oriented to collect fluid sprayed toward the at least one roller brush;
a pumping unit connected to the recycling tank and the fluid supply tube, the pumping unit configured to pump fluid from the recycling tank to the fluid supply tube;
and a control valve mechanically connecting both the pumping unit and the fluid source to the fluid supply tube, the control valve configured to selectively create a fluid connection between the fluid supply tube and at least one of the pumping unit and the fluid source.

9. A roller brush bed comprising
a plurality of roller brushes;
a drive system applying torque to a roller brush of the plurality of roller brushes;
and a fluid delivery system comprising:
a fluid source;
a fluid supply tube connected to the fluid source;
a movable fluid delivery bar in fluid communication with the fluid supply tube; and
a drive system attached to the movable fluid delivery bar and configured to move the movable fluid delivery bar relative to the plurality of roller brushes and along the roller brush bed, wherein the movable fluid delivery bar is configured to spray fluid toward the plurality of roller brushes while the movable fluid delivery bar is moved along the roller brush bed,
wherein the drive system comprises a drive chain which supports the at least one roller brush, and
wherein the movable fluid delivery bar is supported and moved relative to the at least one roller brush supported by the drive chain.

10. The roller brush bed of claim 9, wherein the drive system of the fluid delivery system comprises:
a drive shaft mechanically coupled to a motor;
a drive wheel mechanically coupled to the drive shaft; and
the drive chain mounted on the drive wheel and configured to rotate with the drive wheel based on torque transmitted from the motor by the drive shaft.

11. The roller brush bed of claim 10, wherein the movable fluid delivery bar is oriented relative to the drive chain to hang beneath the drive chain during rotation of the drive wheel based on torque transmitted from the motor by the drive shaft.

12. The roller brush bed of claim 11, wherein the drive chain includes a drop link; and wherein the drop link rotatably attaches the movable fluid delivery bar to the drive chain.

13. The roller brush bed of claim 11, wherein the drive chain is oriented to move the fluid delivery bar relative to the plurality of roller brushes in both a first direction and a second direction opposite the first direction;
wherein the movable fluid delivery bar is oriented to contact the roller brush when the movable fluid delivery bar is moved in the first direction; and
wherein the movable fluid delivery bar is oriented to be separated from the roller brush when the movable fluid delivery bar is moved in the second direction.

14. The roller brush bed of claim 10, wherein the drive system applying the torque to the roller brush comprises:
another motor different from the motor, the other motor configured to generate the torque;
a transmission configured to transmit the torque generated by the other motor to the roller brush.

15. The roller brush bed of claim 14, further comprising a controller connected to both the motor and the other motor, wherein the controller is configured to control the motor to generate a first rotational velocity and control the other motor to generate a second rotational velocity, different from the first rotational velocity.

16. The roller brush bed of claim 15, further comprising another drive system applying another torque to another roller brush of the plurality of roller brushes, the other roller brush being different from the roller brush, the other drive system applying torque to the other roller brush comprising:
a third motor different from the motor and the other motor, the third motor generating the other torque;
another transmission configured to transmit the other torque generated by the third motor to the other roller brush.

17. The roller brush bed of claim 16, further comprising a controller connected to the motor, the other motor, and the third motor,
wherein the controller is configured to control the motor to generate a first rotational velocity, control the other motor to generate a second rotational velocity, different from the first rotational velocity, and control the third motor to generate a third rotational velocity different from the first rotational velocity and the second rotational velocity.

18. The roller brush bed of claim 9, wherein the movable fluid delivery bar comprises at least one sprayer nozzle oriented to direct fluid toward the plurality of roller brushes, wherein the at least one sprayer nozzle is configured to direct fluid at an acute angle relative to plurality of roller brushes.

19. The roller brush bed of claim 9, wherein the fluid delivery system further comprises:
a stationary supply tube connected to the fluid source; and
at least one stationary sprayer connected to the stationary supply tube and configured to spray fluid toward the plurality of roller brushes.

20. The roller brush bed of claim 9, further comprising
a fluid recycling tank oriented to collect fluid sprayed toward the plurality of roller brushes;
a pumping unit connected to the recycling tank and the fluid supply tube, the pumping unit configured to pump fluid from the recycling tank to the fluid supply tube;
and a control valve mechanically connecting both the pumping unit and the fluid source to the fluid supply tube, the control valve configured to selectively create a fluid connection between the fluid supply tube and at least one of the pumping unit and the fluid source.

* * * * *